United States Patent [19]
Dannheim

[11] Patent Number: 6,114,511
[45] Date of Patent: Sep. 5, 2000

[54] WATER-SOLUBLE MONOAZO COMPOUNDS, PREPARATION THEREOF AND USE THEREOF AS DYES

[75] Inventor: Jörg Dannheim, Frankfurt am Main, Germany

[73] Assignee: Dystar Textilfarben GmbH & Co., Deutschland KG, Germany

[21] Appl. No.: 09/317,566

[22] Filed: May 24, 1999

[30] Foreign Application Priority Data

May 27, 1998 [DE] Germany .............................. 198 23 634

[51] Int. Cl.$^7$ ....................... C09B 62/028; C09B 62/085; D06P 1/382
[52] U.S. Cl. .................................. 534/633; 534/638; 8/549
[58] Field of Search ...................... 534/638, 633

[56] References Cited

U.S. PATENT DOCUMENTS

| | | | |
|---|---|---|---|
| 4,191,687 | 3/1980 | Austin | 534/638 |
| 4,837,310 | 6/1989 | Morimitsu et al. | 534/638 |
| 5,541,301 | 7/1996 | Jordine et al. | 534/638 X |

FOREIGN PATENT DOCUMENTS

| | | |
|---|---|---|
| 922 735 | 2/1998 | European Pat. Off. . |
| 62-167364 | 7/1987 | Japan . |
| 63-210170 | 8/1988 | Japan . |

*Primary Examiner*—Fiona T. Powers
*Attorney, Agent, or Firm*—Connolly, Bove, Lodge & Hutz LLP

[57] ABSTRACT

Fiber-reactive, water-soluble monoazo compounds conforming to the hereinbelow indicated and defined general formula (1) are capable of dyeing hydroxyl- and/or carboxamido-containing material, especially fiber material, such as cellulose fibers, for example cotton, or regenerated cellulose fibers and also wool and synthetic polyamide fibers in red shades and in high color strength and good fastnesses.

(1)

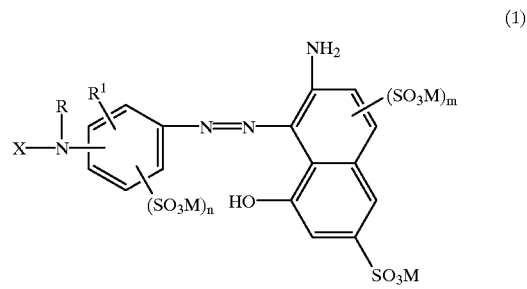

where M is hydrogen, an alkali metal or some other colorless salt-forming metal, R is hydrogen or optionally sulfo-, methoxy-, ethoxy-, hydroxyl-, sulfato-, phosphate-, acetyloxy- or propionyloxy-substituted alkyl of 1 to 4 carbon atoms, $R^1$ is hydrogen, carboxyl, optionally substituted alkyl of 1 to 4 carbon atoms or alkoxy of 1 to 4 carbon atoms, m is zero or 1, n is zero, 1 or 2 and X is a fiber-reactive radical from the halopyrimidine, dichloroquinoxazoline or fluorotriazinylamino series.

11 Claims, No Drawings

WATER-SOLUBLE MONOAZO COMPOUNDS, PREPARATION THEREOF AND USE THEREOF AS DYES

DESCRIPTION

Water-soluble moncazo compounds, preparation thereof and use thereof as dyes

This invention relates to the technical field of fiber-reactive azo dyes.

There is extensive literature on monoazo compounds which, for example on cellulose fiber materials, afford strong red dyeings and in which the diazo component, but generally the coupling component, possesses a fiber-reactive radical of the halopyrimidine or halotriazine series which is attached to the diazo or coupling component via an amino group. The coupling components are generally sulfo-substituted amino-1-naphthols, to which the diazo component is coupled in a neutral medium in position 2. In contrast, there is hardly any literature describing red-dyeing azo compounds which contain such fiber-reactive radicals and an acid-coupled 2-aminonaphthol coupling component and where the azo group is disposed adjacent to the amino group, i.e., in position 1. Only U.S. Pat. No. 3,043,649 describes a monoazo compound of this type in Example 1, but its dye properties are very unsatisfactory; because of a low degree of fixation it merely provides weak dyeings.

The present invention, then, provides novel monoazo compounds which possess very good fiber-reactive dye properties, provide dyeings in high color strength and, what is more, possess good fastness properties, for example a high perspiration lightfastness, and which conform to the general formula (1)

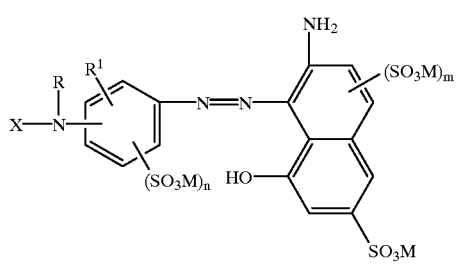

(1)

where:
- M is hydrogen or an alkali metal, such as sodium, potassium or lithium, or some other colorless salt-forming metal, such as the equivalent of an alkaline earth metal, as of calcium, preferably hydrogen or an alkali metal;
- R is hydrogen or alkyl of 1 to 4 carbon atoms, such as methyl and ethyl, or alkyl of 1 to 4 carbon atoms, such as ethyl, which may be substituted by sulfo, methoxy, ethoxy, hydroxyl, sulfato, phosphate, acetyloxy or propionyloxy, and is preferably ethyl or methyl and particularly preferably hydrogen;
- $R^1$ is hydrogen, carboxyl, alkyl of 1 to 4 carbon atoms, such as methyl and ethyl, which may be substituted, for example by alkoxy of 1 to 4 carbon atoms, such as methoxy and ethoxy, sulfo or carboxyl, or is alkoxy of 1 to 4 carbon atoms, such as methoxy and ethoxy, which may be substituted, for example by sulfo or carboxyl, and is preferably methyl or hydrogen and particularly preferably hydrogen;
- m is zero or 1 (this group being hydrogen in the case of m being zero), preferably zero;
- n is zero, 1 or 2 (this group being hydrogen in the case of n being zero), preferably 1;
- X is a fiber-reactive group or grouping of the general formula (3a), (3b), (3c), (3d), (3e) or (3f), preferably of the general formula (3f)

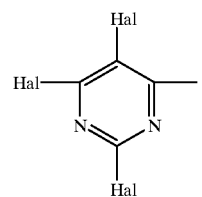

(3a)

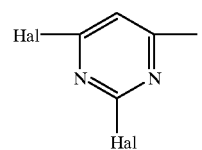

(3b)

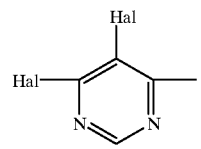

(3c)

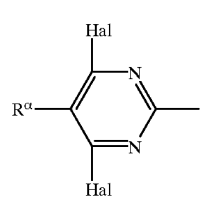

(3d)

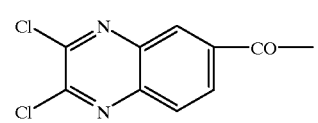

(3e)

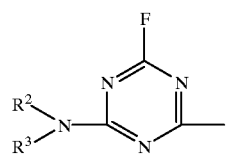

(3f)

where:
- Hal is every time (and mutually identically or differently) chlorine, bromine or fluorine; preferably chlorine or fluorine;
- $R^\alpha$ is hydrogen or Hal as defined above;
- $R^2$ is hydrogen or alkyl of 1 to 4 carbon atoms, such as methyl and ethyl, which may be substituted by hydroxyl, alkanoyloxy of 2 to 5 carbon atoms, such as acetyloxy, sulfato, phosphate, carboxyl, sulfo or alkoxy of 1 to 4 carbon atoms, such as methoxy and ethoxy, preferably hydrogen;
- $R^3$ is hydrogen or alkyl of 1 to 4 carbon atoms, such as methyl and ethyl, which may be substituted by hydroxyl, alkanoyloxy of 2 to 5 carbon atoms, such as acetyloxy, sulfato, phosphate, carboxyl, sulfo or alkoxy of 1 to 4 carbon atoms, such as methoxy and ethoxy, or is an optionally methyl-monosubstituted or -disubstituted cycloalkyl of 5 to 8 carbon atoms or is phenyl which may be substituted by 1 or 2 substituents selected from the group consisting of sulfo, carboxyl, β-sulfatoethylsulfonyl, vinylsulfonyl, chlorine, alkyl of 1 to 4 carbon atoms, such as ethyl and especially methyl, and alkoxy of 1 to 4 carbon atoms, such as ethoxy and especially methoxy, or is naphthyl which may be substituted by sulfo and/or β-sulfatoethylsulfonyl or vinylsulfonyl, or $R^2$ and $R^3$ combine to form an alkylene of 5 to 8 carbon atoms or an alkylene of 4 to 6 carbon atoms which is interrupted by —O— or —NH— and with the nitrogen atom to form the radical of a saturated heterocycle, for example piperidino, morpholino or piperazino;

the X—N(R)— group is disposed on the benzene nucleus in a position meta or para, preferably meta, to the azo group;

when n is 1 or 2 the (one) sulfo group is preferably attached to the benzene nucleus in a position ortho to the azo group.

In the above general formulae and also in the subsequent general formulae, the individual elements of the formulae, whether they bear identical or different designations within any one general formula, can have meanings under their definition which are mutually identical or different.

The terms "sulfo", "carboxyl", "phosphate" and "sulfato" cover not only the acid form but also the salt form of the respective groups. Accordingly, sulfo groups are groups conforming to the general formula —$SO_3M$, carboxyl groups are groups conforming to the general formula —COOM, phosphato groups are groups conforming to the general formula —$OPO_3M_2$ and sulfato groups are groups conforming to the general formula –$OSO_3M$, where each M is as defined above.

Of the monoazo compounds of the general formula (1), preference is given to those in which n is 1 or 2, m is zero and X is a radical of the general formula (3f).

Preference is further given to those monoazo compounds in which n is 1 or 2, m is 1 and X is a group of the general formula (3a), (3b) or (3c) or a radical of the formula (3f) where $R^2$ is hydrogen and $R^3$ is β-sulfatoethylsulfonylphenyl or vinylsulfonylphenyl.

Emphasis must further be given to those monoazo compounds of the general formula (1) in which m is zero, n is 2 and X is a radical of the general formula (3a), (3b) or (3f).

Fiber-reactive groups conforming to the general formulae (3a) to (3d) are for example 2,4-difluoro-5-chloropyrimidin-6-yl, 2,4-difluoropyrimidin-6-yl, 4,6-difluoro-5-chloropyrimidin-2-yl and 4,6-difluoropyrimidin-4-yl.

Fiber-reactive groups of the general formula (3f) are for example those in which $R^2$ is hydrogen, methyl, ethyl, β-hydroxyethyl, β-sulfatoethyl or β-sulfoethyl, preferably hydrogen, and $R^3$ is hydrogen, hydroxyl-, sulfato-, phosphate-, carboxyl-, sulfo-, methoxy- or ethoxy-substituted ethyl, optionally methyl- monosubstituted or—disubstituted cyclohexyl, phenyl or phenyl substituted by 1 or 2 substituents from the group consisting of sulfo, carboxyl, chlorine, methyl, ethyl, methoxy and ethoxy or is sulfo- and/or carboxyl-substituted naphthyl, preferably 2-naphthyl, and preferably sulfo- and/or carboxyl-substituted phenyl, especially mono- or disulfophenyl, for example methyl, ethyl, β-hydroxyethyl, β-sulfatoethyl, β-sulfoethyl, β-methoxyethyl, β-ethoxyethyl, cyclohexyl, 2-sulfophenyl, 3-sulfophenyl, 4-sulfophenyl, 2,5-disulfophenyl, 3,5-disulfophenyl, 2,4-disulfophenyl, 2-carboxyphenyl, 1-sulfo-naphth-2-yl, 1,5-disulfonaphth-2-yl, 3- or 4-(β-sulfatoethylsulfonyl)phenyl or 3- or 4-vinylsulfonylphenyl; preferably the group $R^2R^3N$- is likewise morpholino. Particularly preferably, $R^2$ is hydrogen and $R^3$ is sulfo- and/or carboxyl-substituted naphthyl and particularly preferably sulfo- and/or carboxyl-substituted phenyl, such as 2-, 3- or 4-sulfophenyl.

Groups of the general formula —$NR^2R^3$ are for example amino, methylamino, ethylamino, β-hydroxyethylamino, dimethylamino, diethylamino, di(β- hydroxyethyl)amino, n-propylamino, β-sulfoethylamino, di(β-sulfoethyl)amino, β-sulfatoethylamino, di(β-sulfatoethyl)amino, N-methyl,N-(β-sulfoethyl)amino, phenylamino, N-methylphenylamino, 2-, 3- or 4-methylphenylamino, 2-, 3- or 4-sulfophenylamino, 2-sulfo4-methylphenylamino, N-methyl-4-sulfophenylamino, 2,5-disulfophenylamino, 2,4-disulfophenylamino, 3,5-disulfophenylamino, 2- or 4-carboxyphenylamino, 2-carboxy-5-sulfophenylamino, I-sulfonaphth-2-ylamino, 6-sulfonaphth-2-ylamino or 1,5-disulfonaphth-2-ylamino, especially β-sulfoethylamino, β-sulfatoethylamino, β-hydroxyethylamino, di(β-hydroxyethyl)amino, di(β-sulfoethyl)amino, di(β-sulfatoethyl)amino, 2,5-disulfophenylamino, 2,4-disulfophenylamino, 3,5-disulfophenylamino and especially 2-sulfophenylamino, 3-sulfophenylamino and 4-sulfophenylamino.

Radicals of the general formula (2)

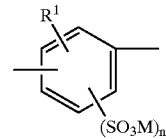

(2)

which are present in the formula (1) are for example 1,4-phenylene, 1,3-phenylene, 2-sulfo-1,4-phenylene, 4-sulfo-1,3-phenylene, 4,6-disulfo-1,3-phenylene, 2,5-disulfo-1,4-phenylene, 2-methyl-1,4-phenylene, 4-methyl-1,3-phenylene, 6-sulfo4-methyl-1,3-phenylene, 6-sulfo-4-methoxy-1,3-phenylene and 5-sulfo-2-methyl-1,3-phenylene.

The monoazo compounds of the general formula (1) according to the invention are preparable in various ways according to the invention, for example by coupling a conventionally prepared diazonium salt of an amine of the general formula (3)

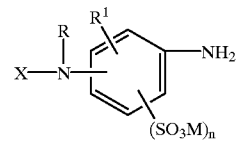

(3)

where X, R, $R^1$, M and n are each as defined above, with an aminonaphthol compound of the general formula (4)

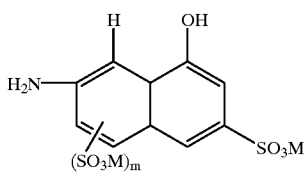

(4)

where M and m are each as defined above, at a temperature between 0 and 25° C., preferably between 5 and 20° C., and at a pH of below 5, preferably between 0.5 and 2.5, or reacting a compound of the general formula (5)

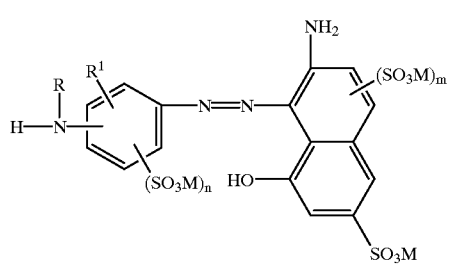

(5)

where R, R¹, M, m and n are each as defined above, with a compound of the general formula X-Hal, where X is a radical of the general formula (3a) to (3d) where Hal is as defined above or a radical of the general formula (3e) where Hal is chlorine or a radical of the general formula (3f) where Hal is fluorine, or, in this synthesis of a monoazo compound of the general formula (1) where X is a radical of the general formula (3f), reacting a compound of the general formula (5) with 2,4,6-trifluoro-1,3,5-triazine (cyanuric fluoride) and reacting the resulting difluorotriazinylamino azo compound with an amine of the general formula $HNR^2R^3$ where $R^2$ and $R^3$ are each as defined above.

The starting compounds of the general formula (4) are known and extensively described in the literature. Similarly, the starting compounds of the general formula (3) and (5) are known or preparable similarly to the methods described in the literature, for example the starting azo compound of the general formula (5) by diazotization of an amino compound of the general formula (6)

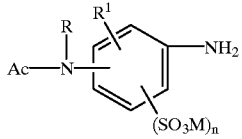

(6)

where R, R¹, M and n are each as defined above and Ac is hydrogen or preferably an acyl radical, such as acetyl radical, as protective group for the diazotization, and coupling onto a compound of the general formula (4) in the acidic range similarly to known procedures and subsequent hydrolytic detachment of the acyl group in known manner. The synthesis of the compound of the general formula (3) can be effected in a well-known manner by reaction of amino compounds with halopyrimidine and halotriazine compounds, for example by reacting a compound of the general formula (6) of the abovementioned definition where Ac is hydrogen with a compound of the general formula X-Hal where X and Hal are each as defined above.

The reactions of the halopyrimidine and fluorotriazine compounds with an amino compound, for example of the general formula $HNR^2R^3$, take place in aqueous solution or aqueous suspension, optionally in the presence of an inert organic solvent, for example dimethyl sulfoxide, dimethylformamide and N-methylpyrrolidone. Generally, the reaction takes place at a temperature between 0 and 30° C., preferably between 0 and 25° C., and at a pH between 4 and 9, preferably between 5 and 8.5.

Starting compounds of the general formula (4) are for example 2-amino-8-naphthol-6-sulfonic acid, 2-amino-8-naphthol-3,6-disulfonic acid and 2-amino-8-naphthol-4,6-disulfonic acid.

Starting compounds of the general formula (6) where Ac is hydrogen are for example 1,4-diaminobenzene, 1,3-diaminobenzene, 2-sulfo-1,4-diaminobenzene, 4-sulfo-1,3-diaminobenzene, 4,6-disulfo-1,3-diaminobenzene, 2,5-disulfo-1,4-diaminobenzene, 2-methyl-1,4-diaminobenzene, 4-methyl-1,3-diaminobenzene, 6-sulfo-4-methoxy-1,3-diamino-benzene, 6-sulfo4-methyl-1,3-diaminobenzene and 5-sulfo-2-methyl-1,3-diaminobenzene, preferably 2-sulfo-1,4-diaminobenzene, 4,6-disulfo-1,3-diaminobenzene, 2,5-disulfo-1,4-diaminobenzene and especially 4-sulfo-1,3-diaminobenzene.

Starting compounds Hal-X conforming to the radicals of the general formulae (3a) to (3d) are for example 2,4,6-difluoro-5-chloropyrimidine and 2,4,6-trifluoropyrimidine.

The separation and isolation from the aqueous synthesis solutions of the monoazo compounds of the general formula (1) according to the invention can be effected by commonly known methods for water-soluble compounds, for example by precipitating from the reaction medium by means of an electrolyte, for example sodium chloride or potassium chloride, or by evaporating the reaction solution itself, for example by spray drying. If the last-mentioned method of isolation is chosen, it is frequently advisable to precede the evaporation by removing any sulfate in the solutions by precipitation as calcium sulfate and removal by means of filtration.

The monoazo compounds of the general formula (1) according to the present invention—hereinafter referred to as compounds (1)—have fiber-reactive properties and possess very useful dye properties. They can therefore be used for dyeing (including printing) hydroxyl-containing and/or carboxamido-containing materials. To this end, the solutions obtained in the synthesis of compounds (1), optionally after addition of a buffer substance and also optionally after concentrating, can be used directly in dyeing as liquid preparation.

The present invention therefore also provides for the use of compounds (1) for dyeing (including printing) hydroxyl- and/or carboxamido-containing materials or, to be more precise, processes for their application to these substrates. The materials are preferably used in the form of fiber materials, especially in the form of textile fibers, such as yarns, wound packages and fabrics. Procedures analogous to existing procedures may be employed.

Hydroxyl-containing materials are those of natural or synthetic origin, for example cellulose fiber materials or their regeneration products and polyvinyl alcohols. Cellulose fiber materials are preferably cotton, but also other vegetable fibers, such as linen, hemp, jute and ramie fibers; regenerated cellulose fibers are for example viscose staple and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The fiber materials can also be processed and dyed in blends or may comprise fiber materials of a different chemical nature, such as polyester fibers. Examples hereof are blend fabrics composed of cellulose fibers and polyester fibers and of cellulose fibers and polyamide fibers.

The compounds (1), as provided for by the use of the present invention, can be applied to and fixed on the substrates mentioned, especially the fiber materials mentioned, by the application techniques known for water-soluble, fiber-reactive dyes, for example by applying the compound (1) in dissolved form onto or into the substrate and fixing it thereon or therein by the action of heat or by the action of the alkaline agent or by means of both measures. Such dyeing and fixing methods are extensively described in the literature (for example in European Patent Publication No. 0 181 585). Thus, the compounds (1) are suitable not only for the exhaust dyeing process but also for dyeing by the pad-dyeing process, whereby the material is impregnated with aqueous, optionally electrolyte salt-containing solutions of the compounds (1) and the compound (1) is fixed on the material in the above-indicated manner. The compounds (1) are particularly useful when applied by the cold pad-batch processes, whereby a dye is applied to the fiber material on a pad-mangle together with the alkaline agents and fixed on the fiber material by storing at room temperature for several hours. After fixing, the dyeings and prints obtained are thoroughly rinsed with cold and hot water, optionally in the presence of an agent which has a dispersing action and promotes the diffusion of the unfixed portions.

The compounds (1) are notable for high reactivity, good fixing capability and good build-up capability. They can therefore be used by the exhaust dyeing process at low dyeing temperatures and require only short steaming times in pad-steam processes. The degrees of fixation are high, and unfixed portions are easily washed off, the difference between the degree of exhaustion and the degree of fixation being remarkably small, which is why the loss on soaping is very small, too. The compounds (1) are also suitable especially in textile printing processes, especially on cellulose fiber materials, such as cotton, but also for printing carboxamido-containing fiber material, for example wool and silk or blend fabrics comprising wool or silk. They are further very useful in discharge printing and resist printing processes.

The dyeings and prints prepared with the compounds (1) possess (especially on cellulose fiber materials) a high color strength and a high bond stability to the fiber not only in the acidic but also in the alkaline range, also good lighffastness, including very good wet lighffastness, and also generally good weffastnesses, such as good wash, water, seawater, crossdyeing and perspiration fastnesses, and also very good perspiration lightfastnesses, further good fastness to pleating and hot pressing and rubfastness.

The examples hereinbelow serve to illustrate the invention. Parts and percentages are by weight, unless otherwise stated. Parts by weight relate to parts by volume as the kilogram relates to the liter.

The compounds described in the examples in terms of a formula are indicated in the form of the free acids; in general, they are prepared and isolated in the form of their alkali metal salts, such as lithium, sodium or potassium salts, and used for dyeing in the form of the salts. The starting compounds and components mentioned in the form of the free acid in the examples hereinbelow, especially table examples, can similarly be used in the synthesis as such or in the form of their salts, preferably alkali metal salts.

The absorption maxima ($\lambda_{max}$) reported in the visible range for the compounds of the invention were determined in aqueous solution on their alkali metal salts. In the table examples, the $\lambda_{max}$ values are given in brackets next to the reported hue; the reported wavelength is in nm.

EXAMPLE 1

A neutral solution of 19 parts of 1,3-diaminobenzene4-sulfonic acid in 4000 parts by volume of ice-water is admixed with 9 parts of sodium bicarbonate; 17 parts of 2,4,6-trifluoro-5-chloropyrimidine are added and the reaction batch is subsequently stirred for about 5 hours at 0 to 10° C. The compound formed is then diazotized by addition of 19 parts of 40% strength aqueous sodium nitrite solution by gradually and continuously adding the reaction batch to a mixture of 30 parts of concentrated aqueous hydrochloric acid and 100 parts of ice with thorough stirring. Excess nitrous acid is then as usual destroyed with amidosulfuric acid, and the diazonium salt suspension is admixed with 23 parts of 2-amino-8-naphthol-6-sulfonic acid. Coupling takes place at a pH between 3 and 5 (which may be maintained with aqueous sodium carbonate solution and at a temperture between 0 and 10° C. Stirring is continued for some time, and the novel azo compound of the formula (written in the form of the free acid)

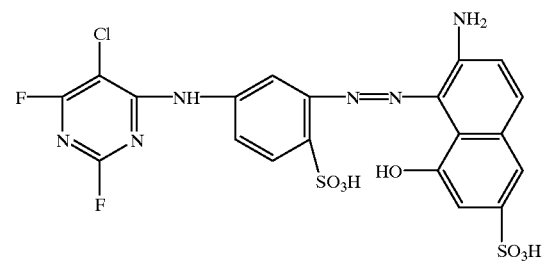

($\lambda_{max}$ = 515 nm)

is then isolated by salting out, for example by means of sodium chloride, as alkali metal salt. It possesses very good fiber-reactive dye properties and, applied by the application processes customary in the art of fiber-reactive dyes, affords on the materials mentioned in the description part, for example cotton, strong red dyeings and prints having good fastness properties, of which a good perspiration lighffastness is particularly noteworthy.

EXAMPLE 2

A neutral solution of 23 parts of 1,3-diaminobenzene4,6-disulfonic acid and 7.2 parts of sodium nitrite and 400 parts of ice-water are gradually and continuously stirred into a mixture of 25 parts of concentrated aqueous hydrochloric acid and 100 parts of ice. After the diazotization has ended, excess nitrous acid is as usual destroyed by means of amidosulfuric acid. 23 parts of 2-amino-8-naphthol-6-sulfonic acid are then added, and the coupling reaction is completed at a pH between 3 and 5 and at a temperature between 5 and 10° C. over several hours.

The suspension obtained is brought to pH 7 and then admixed with 18 parts of 2-dimethylamino4,6-difluorotriazine. Stirring of the reaction mixture is subsequently continued for about 6 hours at a temperature of 20 to 30° C. and a pH of 7, and the novel azo compound of the formula (written in the form of the free acid)

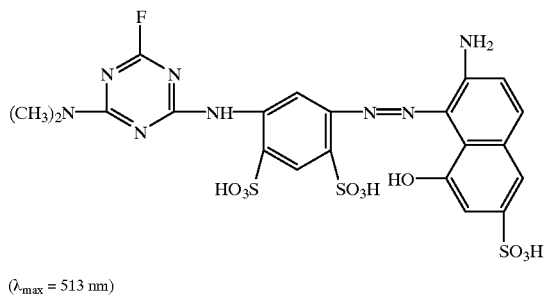

($\lambda_{max}$ = 513 nm)

is then isolated by salting out, for example by means of sodium chloride, as alkali metal salt. It possesses good dye properties and, applied by the dyeing and printing processes customary for fiber-reactive dyes, affords on the materials mentioned in the description part, for example cellulose fiber materials such as cotton, strong red dyeings and prints having good fastness properties, of which a good perspiration lightfastness is particularly noteworthy.

EXAMPLE 3

17.5 parts of aniline-3-sulfonic acid and 15.0 parts of trifluorotriazine are reacted in accordance with the directions of German Offenlegungsschrift 2,746,109. The solution obtained is admixed with 18 parts of 1,3-diaminobenzene-4-sulfonic acid, and the batch is subsequently stirred for about 4 hours at 0 to 10° c. while a pH of 6 to 7 is maintained.

The compound obtained is diazotized and coupled with 23 parts of 2-amino-8-naphthol-6-sulfonic acid similarly to Example 1 of the present invention.

The novel azo compound of the formula (written in the form of the free acid)

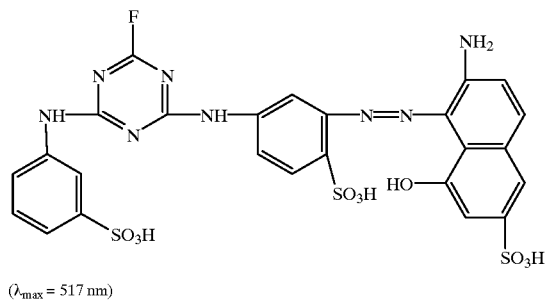

($\lambda_{max}$ = 517 nm)

is isolated from the synthesis batch in a conventional manner, for example by salting out with sodium chloride. It is useful, especially in the form of an alkali metal salt, for dyeing the fiber materials mentioned in the description part, especially cofton, and applied by the application processes customary in the art for fiber-reactive dyes affords strong red dyeings and prints having good fastness properties, of which the good perspiration lightfastness is particularly noteworthy.

EXAMPLE 4 a) A neutral solution of 23 parts of 1-acetylamino-3-amino-4-sulfonic acid in 300 parts of ice-water is admixed with 19 parts of 40% strength by weight aqueous sodium nitrite solution, and the solution is gradually and continuously stirred into a mixture of 30 parts of concentrated aqueous hydrochloric acid and 100 parts of ice. After removal of excess nitrous acid, 23 parts of 2-amino-8-naphthol-6-sulfonic acid are added, and the coupling reaction is carried out at a pH of 3 to 5 and a temperature of from 0 to 10° C.

The resulting aminoazo compound of the formula (written in the form of the free acid)

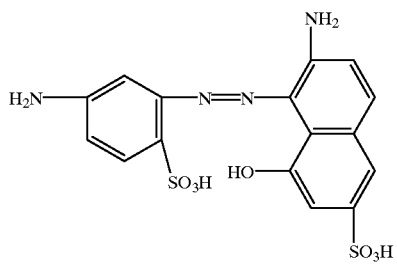

is isolated by salting out.

b) 42 parts of this aminoazo compound (in the form of the sodium salt) are dissolved in 800 parts of ice-water. 16 parts of trifluorotriazine are gradually and continuously added with thorough stirring while a pH of 6 to 7 is maintained by means of aqueous sodium carbonate solution. After a reaction time of about 30 minutes, 17 parts of aniline-3-sulfonic acid are stirred in, and the reaction with the difluorotriazinylamino azo compound formed is completed at a pH of 6 and a temperature of 0 to 10° C. by stirring for about 3 hours.

The novel azo compound thus prepared is isolated in a conventional manner. It is identical to the azo compound of Example 3 and exhibits the same good dye properties.

EXAMPLE 5

An azo compound according to the present invention is prepared by reacting 42 parts of the aminoazo compound prepared in Example 4a) with 16 parts of trifluorotriazine as described in Example 4b) and the batch with the resulting difluorotriazinylaminoazo compound of the formula

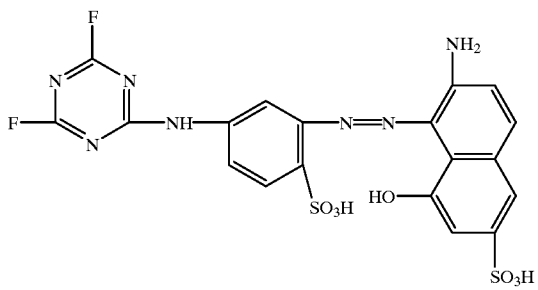

is then admixed with 12.5 parts of β-sulfoethylamine; the reaction takes place at a pH of 8 to 9 and a temperature of 0 to 10° C.

The resulting azo compound of the formula (written in the form of the free acid)

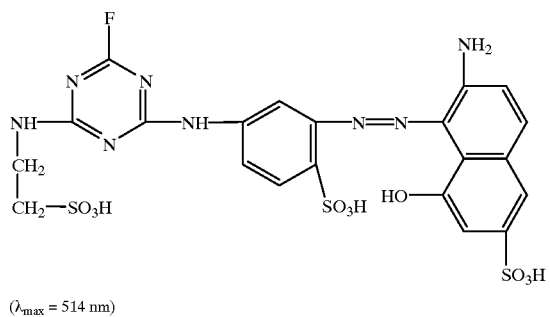

($\lambda_{max}$ = 514 nm)

is isolated as alkali metal salt in a conventional manner. It has good dye properties and affords, for example cotton, strong red dyeings and prints having good fastness properties.

EXAMPLE 6

A neutral solution of 17.3 parts of aniline-2-sulfonic acid in 300 parts of ice-water is gradually and continuously admixed with 15 parts of trifluorotriazine by thorough stirring while the pH is maintained at 4 to 5 by means of aqueous sodium hydroxide solution. The batch is subsequently stirred for a further 30 minutes or so, then 250 parts of a pH 6-7 aqueous solution of 17 parts of 1,3-diaminobenzene-4-sulfonic acid are added with stirring, and the batch is stirred for about a further 5 hours at a pH between 6 and 7 at a temperature of 0 to 5° C.

The intermediate obtained is indirectly diazotized in a conventional manner. The resulting diazonium salt solution is adjusted to pH 4 to 5, and a suspension of 21.5 parts of finely ground 2-amino-8-naphthol-6-sulfonic acid in 100 parts of water is stirred in. The coupling reaction is carried out at a temperature between 10 and 15° C. and a pH of 4 to 5, which may be maintained with sodium bicarbonate.

The batch is then brought to pH 7.5, buffered, for example with a mixture of disodium hydrogen phosphate and sodium dihydrogen phosphate, and the resulting novel azo compound which, written in the form of the free acid, conforms to the formula

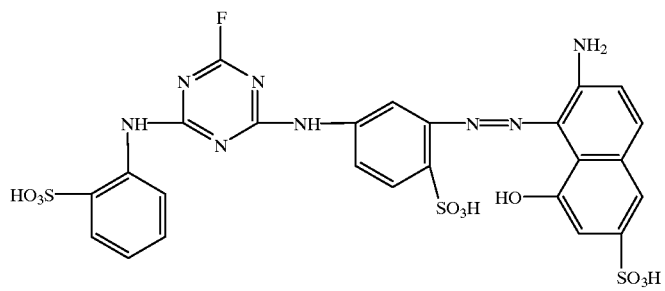

($\lambda_{max}$ = 515 nm)

is isolated in a conventional manner, for example by salting out with sodium chloride or by spray drying.

The azo compound of the invention possesses very good fiber-reactive dye properties and, applied by the dyeing and printing processes customary in the art of fiber-reactive dyes, affords on the material mentioned in the description, for example cotton, strong red dyeings and prints having good fastness properties, of which the good perspiration fastnesses are particularly noteworthy.

EXAMPLES 7 TO 55

The table examples hereinbelow describe further novel azo compounds conforming to the general formula (A)

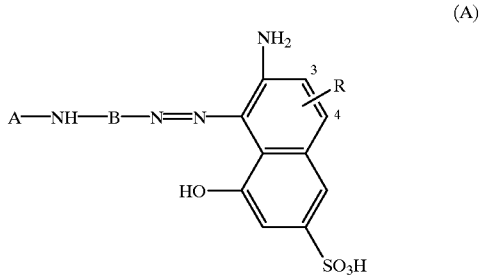

(A)

(each written in the form of the free acid). They can be prepared in a manner according to the invention, for example analogously to one of the above operative examples, from the starting compounds evident from the general formula (A) (a halogen-substituted pyrimidine or an optionally amino-substituted halotriazine conforming to the general formula A-Hal where Hal is fluorine or chlorine, a sulfo-substituted diaminobenzene conforming to the formula $H_2N$—B—$NH_2$ as diazotizable component and a sulfo-substituted 2-aminonaphthol). They possess very good fiber-reactive dye properties and, dye the fiber materials mentioned in the description part, especially cellulose fiber materials, in the hue reported (for cotton in this case) in the respective table example in high color strength and good fastnesses.

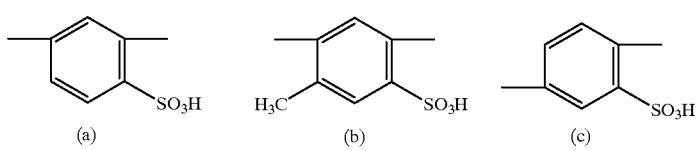

(a)     (b)     (c)

Compound of formula (A)

| Ex. | A | B | R | Hue |
|---|---|---|---|---|
| 7 | 4,5-difluoropyrimidin-6-yl | formula (c) | hydrogen | red (518) |
| 8 | " | formula (a) | hydrogen | red (510) |
| 9 | 5-chloro-4-fluoropyrimidin-6-yl | formula (a) | hydrogen | red (515) |
| 10 | " | formula (c) | hydrogen | red (516) |
| 11 | 2,3-dichloroquinoxaline-6-carbonyl | formula (c) | hydrogen | red (517) |
| 12 | " | 4,6-disulfo-1,3-phenylene | hydrogen | red (512) |
| 13 | " | 4,6-disulfo-1,3-phenylene | hydrogen | red (512) |
| 14 | " | formula (a) | 3-sulfo | red (516) |
| 15 | 5-chloro-2,4-difluoropyrimidin-6-yl | formula (a) | 3-sulfo | red (514) |
| 16 | 2,4-difluoropyrimidin-6-yl | formula (a) | 3-sulfo | red (516) |
| 17 | " | formula (c) | 3-sulfo | red (518) |
| 18 | " | 4,6-disulfo-1,3-phenylene | 3-sulfo | red (514) |
| 19 | " | 4,6-disulfo-1,3-phenylene | hydrogen | red (513) |
| 20 | 5-chloro-2,4-difluoropyrimidin-6-yl | 4,6-disulfo-1,3-phenylene | hydrogen | red (514) |
| 21 | " | 3,6-disulfo-1,4-phenylene | hydrogen | red (520) |
| 22 | 2,4-difluoropyrimidin-6-yl | 3,6-disulfo-1,4-phenylene | hydrogen | red (517) |
| 23 | " | formula (c) | hydrogen | red (519) |
| 24 | 4,5-difluoropyrimidin-6-yl | 3,6-disulfo-1,4-phenylene | hydrogen | red (515) |
| 25 | " | 4,6-disulfo-1,3-phenylene | hydrogen | red (515) |
| 26 | " | 4,6-disulfo-1,3-phenylene | 4-sulfo | red (515) |
| 27 | 5-chloro-2,4-difluoropyrimidin-6-yl | formula (c) | hydrogen | red (517) |
| 28 | " | formula (b) | hydrogen | red (519) |
| 29 | 2-fluoro-4-(2'-sulfophenyl)amino-s-triazin-6-yl | formula (a) | hydrogen | red (515) |
| 30 | 2-fluoro-4-(4'-sulfophenyl)amino-s-triazin-6-yl | formula (a) | hydrogen | red (516) |
| 31 | 2-fluoro-4-(2'-sulfo-4'-methyl-phenyl)amino-s-triazin-6-yl | formula (a) | hydrogen | red (514) |
| 32 | 2-fluoro-4-(2'-sulfo-4'-methyl-phenyl)amino-s-triazin-6-yl | formula (c) | hydrogen | red (518) |
| 33 | 2-fluoro-4-(2'-sulfophenyl)amino-s-triazin-6-yl | formula (c) | hydrogen | red (518) |
| 34 | 2-fluoro-4-(3'-sulfophenyl)amino-s-triazin-6-yl | formula (c) | hydrogen | red (519) |
| 35 | 2-fluoro-4-(2'-carboxyphenyl)amino-s-triazin-6-yl | formula (c) | hydrogen | red (518) |
| 36 | 2-fluoro-4-(1'-sulfo-naphth-2'-yl)-amino-s-triazin-6-yl | formula (a) | hydrogen | red (514) |
| 37 | 2-fluoro-4-(1'-sulfo-naphth-2'-yl)-amino-s-triazin-6-yl | formula (a) | hydrogen | red (515) |
| 38 | 2-fluoro-(1',5'-disulfo-naphth-2'-yl)-amino-s-triazin-6-yl | 4,6-disulfo-1,3-phenylene | hydrogen | red (513) |
| 39 | 2-fluoro-(1',5'-disulfo-naphth-2'-yl)-amino-s-triazin-6-yl | 4,6-disulfo-1,3-phenylene | hydrogen | red (520) |
| 40 | 2-fluoro-4-(2'-sulfophenyl)amino-s-triazin-6-yl | 4,6-disulfo-1,3-phenylene | hydrogen | red (512) |
| 41 | 2-fluoro-4-(2'-sulfo-4'-methyl-phenyl)amino-s-triazin-6-yl | 4,6-disulfo-1,3-phenylene | hydrogen | red (515) |
| 42 | 2-fluoro-4-(3'-sulfophenyl)amino-s-triazin-6-yl | 4,6-disulfo-1,3-phenylene | hydrogen | red (516) |
| 43 | 2,4-difluoropyrimidin-6-yl | formula (a) | hydrogen | red (514) |
| 44 | 2-fluoro-4-[4'-(β-sulfatoethyl-sulfonyl)-phenyl]amino-s-triazin-6-yl | formula (a) | sulfo | red (510) |
| 45 | 2-fluoro-4-amino-s-triazin-6-yl | formula (a) | hydrogen | red (515) |
| 46 | 2-fluoro-4-methylamino-s-triazin-6-yl | formula (a) | hydrogen | red (513) |
| 47 | 2-fluoro-4-phenylamino-s-triazin-6-yl | formula (a) | hydrogen | red (511) |
| 48 | 2-fluoro-4-(4'-chlorophenyl)amino-s- | formula (a) | hydrogen | red (516) |

-continued

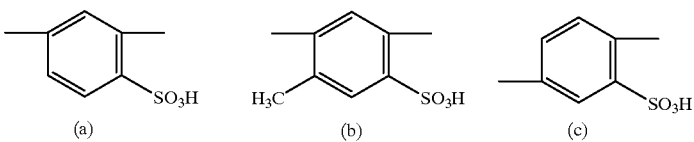

| | Compound of formula (A) | | | |
|---|---|---|---|---|
| Ex. | A | B | R | Hue |
| 49 | 2-fluoro-4-dimethylamino-s-triazin-6-yl | formula (a) | hydrogen | red (514) |
| 50 | 2-fluoro-4-ethylamino-s-triazin-6-yl | formula (a) | hydrogen | red (517) |
| 51 | 2-fluoro-4-[4'-(β-sulfatoethyl-sulfonyl)phenyl]amino-s-triazin-6-yl | formula (a) | hydrogen | red (517) |
| 52 | 2-fluoro-4-[3'-(β-sulfatoethyl-sulfonyl)phenyl]amino-s-triazin-6-yl | formula (a) | hydrogen | red (515) |
| 53 | 2-fluoro-4-[3'-(β-sulfatoethyl-sulfonyl)phenyl]amino-s-triazin-6-yl | formula (a) | sulfo | red (512) |
| 54 | 2-fluoro-4-(4'-vinylsulfonylphenyl)-amino-s-triazin-6-yl | formula (a) | sulfo | red (511) |
| 55 | 2,4-difluoropyrimidin-6-yl | formula (b) | hydrogen | red (514) |

What is claimed is:

1. A monoazo compound conforming to the formula (1)

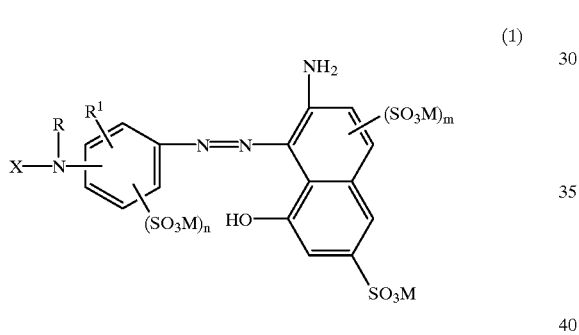

where:

M is hydrogen or an alkali metal, or some other colorless salt-forming metal;

R is hydrogen or alkyl of 1 to 4 carbon atoms, or alkyl of 1 to 4 carbon atoms, which is optionally substituted by sulfo, methoxy, ethoxy, hydroxyl, sulfato, phosphate, acetyloxy or propionyloxy;

$R^1$ is hydrogen, carboxyl, alkyl of 1 to 4 carbon atoms, which is optionally substituted, or is alkoxy of 1 to 4 carbon atoms, which is optionally substituted;

m is zero (this group being hydrogen);

n is zero, 1 or 2 (this group being hydrogen in the case of n being zero); X is a fiber-reactive group or grouping of the formula (3a), (3b), (3c), (3d), (3e) or (3f)

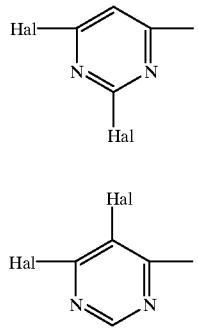

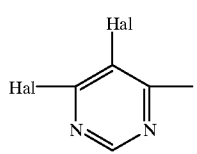

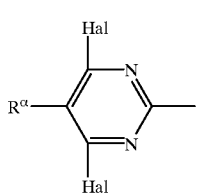

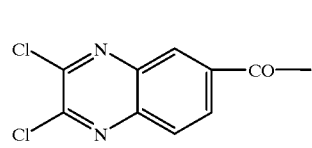

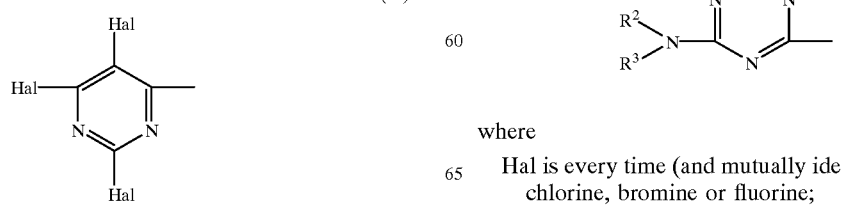

where

Hal is every time (and mutually identically or differently) chlorine, bromine or fluorine;

$R^\alpha$ is hydrogen or Hal is defined above;

$R^2$ is hydrogen;

$R^3$ is hydrogen or alkyl of 1 to 4 carbon atoms, which is optionally substituted by hydroxyl, alkanoyloxy of 2 to 5 carbon atoms, sulfato, phosphato, carboxyl, sulfo or alkoxy of 1 to 4 carbon atoms, or is an optionally methyl-monosubstituted or -disubstituted cycloalkyl of 5 to 8 carbon atoms or is phenyl which is optionally substituted by 1 or 2 substituents selected from the group selected from the group consisting of sulfo, carboxyl, β-sulfatoethylsulfonyl, vinylsulfonyl, chlorine, alkyl of 1 to 4 carbon atoms, and alkoxy of 1 to 4 carbon atoms, or $R^2$ and $R^3$ combine to form an alkylene of 5 to 8 carbon atoms or an alkylene of 4 to 6 carbon atoms which is interrupted by —O— or —NH— and with the nitrogen atoms to form the radical of saturated heterocycle;

the X—N(R)— group is disposed on the benzene nucleus in position meta or para, to the azo group.

2. The monoazo compound of claim 1, wherein R is ethyl, methyl or hydrogen.

3. The monoazo compound of claim 1, wherein $R^1$ is hydrogen.

4. The monoazo compound of claim 1, wherein X is a radical of the formula (3f), n is 1 or 2 and m is zero.

5. The monoazo compound of claim 1, wherein X is a radical of the formula (3f) where $R^2$ is hydrogen and $R^3$ is phenyl or phenyl substituted by 1 or 2 substituents selected from the group consisting of sulfo, carboxyl, chlorine, methyl, ethyl, methoxy and ethoxy.

6. The monoazo compound of claim 5, wherein $R^3$ is mono- or disulfophenyl.

7. The monoazo compound as claimed in claim 1 wherein

M is hydrogen, sodium, potassium or lithium,

R is ethyl, methyl or hydrogen, $R^1$ is hydrogen, methyl, m is zero, n is 1,

Hal is chlorine or fluorine and $R^\alpha$ is hydrogen or chlorine.

8. A monoazo compound conforming to the formula (1)

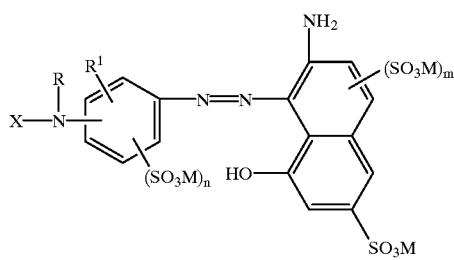

(1)

where:

M is hydrogen or an alkali metal, or some other colorless salt-forming metal;

R is hydrogen or alkyl of 1 to 4 carbon atoms, or alkyl of 1 to 4 carbon atoms, which is optionally substituted by sulfo, methoxy, ethoxy, hydroxyl, sulfato, phosphato, acetyloxy or propionyloxy;

$R^1$ is hydrogen, carboxyl, alkyl of 1 to 4 carbon atoms, which is optionally substituted, or is alkoxy of 1 to 4 carbon atoms, which is optionally substituted;

m is zero or 1 (this group being hydrogen in the case of m being zero);

n is zero, 1 or 2 (this group being hydrogen in the case of n being zero);

X is a fiber-reactive group or grouping of the formula (3f)

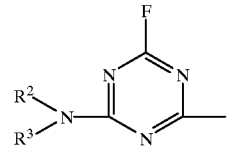

(3f)

where $R^2$ is hydrogen;

$R^3$ is phenyl or phenyl substituted by 1 or 2 substituents selected from the group consisting of sulfo, carboxyl, chlorine, methyl, ethyl, methoxy and ethoxy or sulfo- and/or carboxy-substituted naphthyl; and the X—N(R)— group is disposed on the benzene nucleus in position meta or para, to the azo group.

9. A process for preparing a monoazo compound of the formula (1)

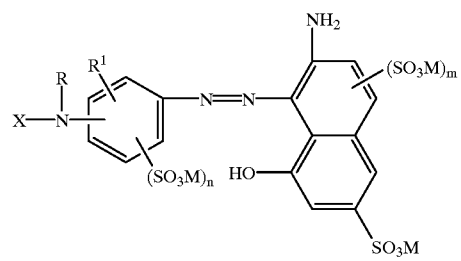

(1)

where:

M is hydrogen or an alkali metal, or some other colorless salt-forming metal;

R is hydrogen or alkyl of 1 to 4 carbon atoms, or alkyl of 1 to 4 carbon atoms, which is optionally substituted by sulfo, methoxy, ethoxy, hydroxyl, sulfato phosphato, acetyloxy or propionyloxy;

$R^1$ is hydrogen, carboxyl, alkyl of 1 to 4 carbon atoms, which is optionally substituted, or is alkoxy of 1 to 4 carbon atoms, which is optionally substituted;

m is zero or 1 (this group being hydrogen in the case of m being zero);

n is zero, 1 or 2 (this croup being hydrogen in the case of n being zero);

X is a fiber-reactive group or grouping of the formula (3a), (3b), (3c), (3d) (3e) or (3f)

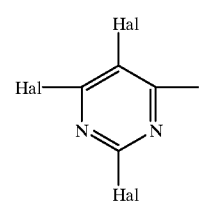

(3a)

-continued

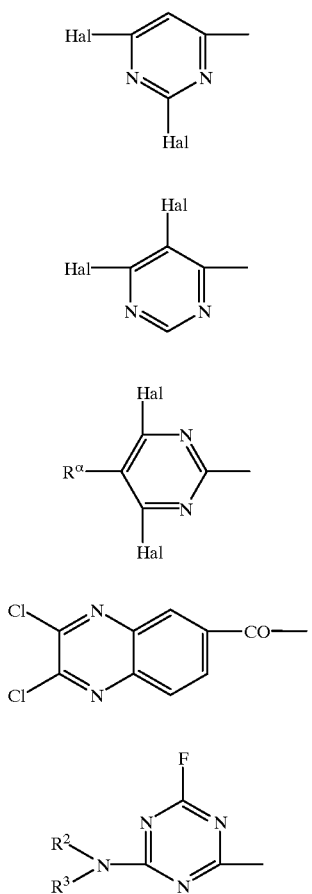

(3b)

(3c)

(3d)

(3e)

(3f)

where
  Hal is every time (and mutually identically or differently) chlorine, bromine or fluorine;
  $R^1$ is hydrogen or Hal is defined above;
  $R^2$ is hydrogen or alkvl of I to 4 carbon atoms, which is optionally substituted by hydroxyl, alkanoyloxy of 2 to 5 carbon atoms, sulfate, phosphato, carboxyl, sulfo or alkoxy of 1 to 4 carbon atoms;
  $R^3$ is hydrogen or alkyl of 1 to 4 carbon atoms, which is optionally substituted by hydroxyl, alkanoyloxy of 2 to 5 carbon atoms, sulfate, phosphato, carboxyl, sulfo or alkoxy of 1 to 4 carbon atoms, or is an optionally methyl-monosubstituted or -disubstituted cycloalkyl of 5 to 8 carbon atoms or is phenyl which is optionally substituted by 1 or 2 substituents selected from the group selected from the group consisting of sulfo, carboxyl, β-sulfatoethylsulfonyl, vinylsulfonyl, chlorine, alkyl of 1 to 4 carbon atoms, and alkoxy of 1 to 4 carbon atoms, or is naphthyl which may be substituted by sulfo and/or β-sulfatoethylsulfonyl or vinylsulfonyl, or
  $R^2$ and $R^3$ combine to form an alkylene of 5 to 8 carbon atoms or an alkylene of 4 to 6 carbon atoms which is interrupted by —O— or —NH— and with the nitrogen atoms to form the radical of saturated heterocycle;
  the X—N(R)— group is disposed on the benzene nucleus in position meta or para, to the azo group, which comprises coupling a diazonium salt of an amine of the formula (3)

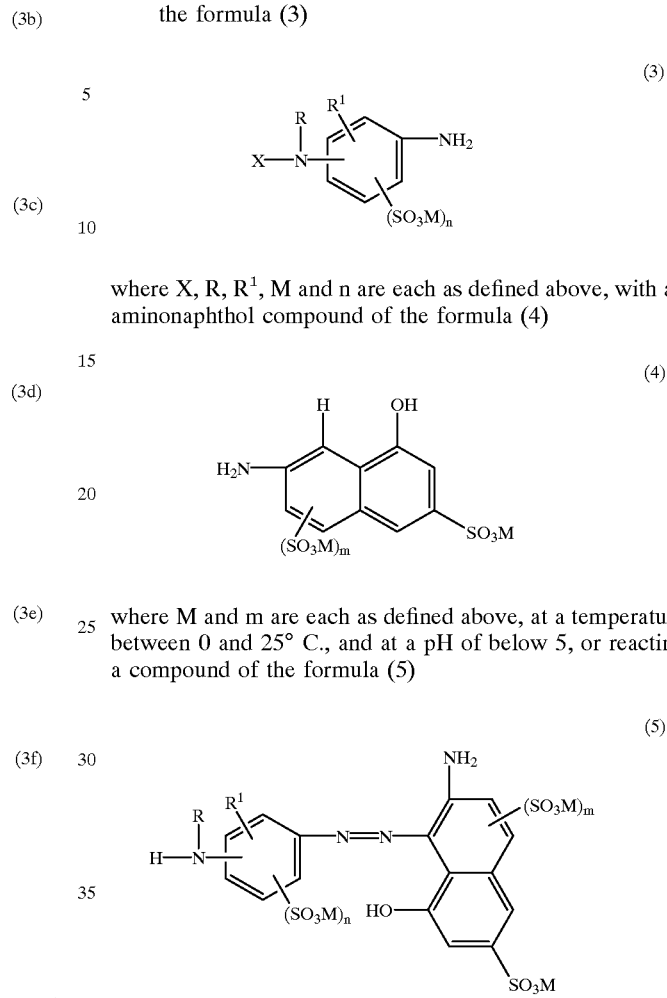

(3)

where X, R, $R^1$, M and n are each as defined above, with an aminonaphthol compound of the formula (4)

(4)

where M and m are each as defined above, at a temperature between 0 and 25° C., and at a pH of below 5, or reacting a compound of the formula (5)

(5)

where R, $R^1$, M, m and n are each as defined [in claim 1] above, with a compound of the formula X—Hal, where X is a radical of the formula (3a) to (3d) where Hal is as defined above or a radical of the formula (3e) where Hal is chlorine or a radical of the formula (3f) where Hal is fluorine, or, in the synthesis of a monoazo compound of the formula (1) where X is a radical of the formula (3f), reacting a compound of the formula (5) with 2,4,6-trifluoro- 1,3,5-triazine (cyanuric fluoride) and reacting the resulting difluorotriazinylamino azo compound with an amine of the formula $HNR^2R^3$ where $R^2$ and $R^3$ are each as defined above.

10. The process as claimed in claim 9 wherein the temperature is between 5 and 20° C. and the pH is between 0.5 and 2.5.

11. A process for dyeing hydroxyl- and/or carboxamido-containing material, which comprises applying a dye which comprises the azo compound as claimed in claim 1 to the material and fixing the dye on the material by means of
  (a) heat,
  (b) with the aid of an alkaline agent or
  (i) by means of heat and with the aid of alkaline agent.

* * * * *

UNITED STATES PATENT AND TRADEMARK OFFICE
CERTIFICATE OF CORRECTION

PATENT NO.   : 6,114,511
DATED        : September 5, 2000
INVENTOR(S)  : Jorg Dannheim It is certified that error appears in the above-identified patent and that said Letters Patent is hereby corrected as shown below:

<u>Column 18,</u>
Line 53, "croup" should read -- group --.

Signed and Sealed this

Sixteenth Day of March, 2004

JON W. DUDAS
*Acting Director of the United States Patent and Trademark Office*